Oct. 25, 1927.
R. T. WALTON
1,646,467
FLAG OR PENNANT SPREADER
Filed Oct. 12, 1926      2 Sheets-Sheet 2
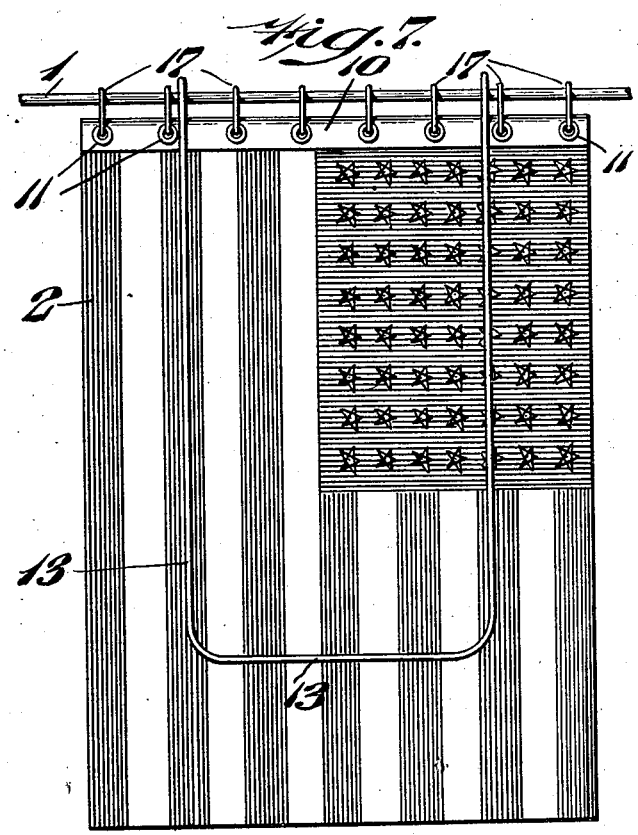
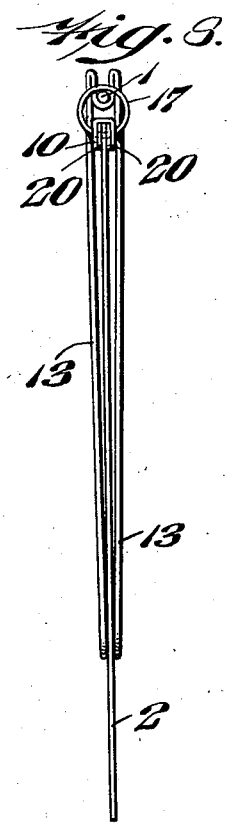
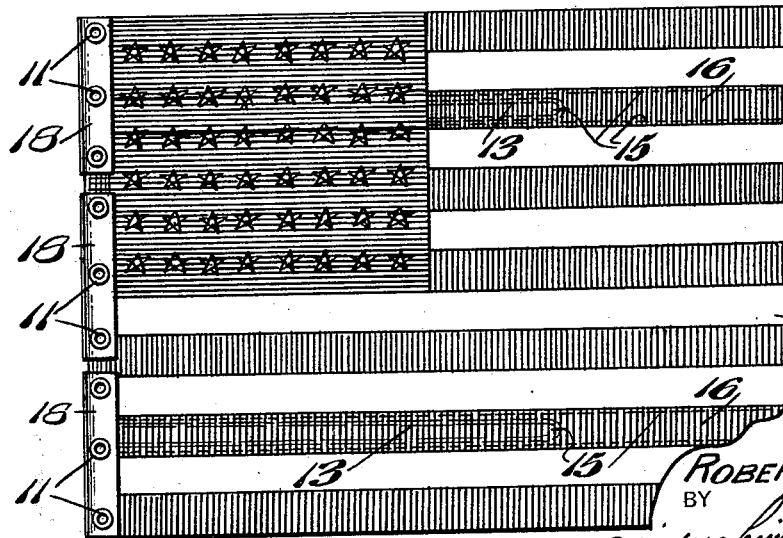
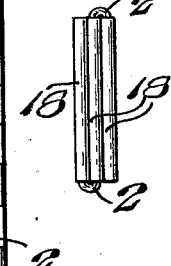
INVENTOR:
ROBERT T. WALTON,
BY
ATTORNEYS.

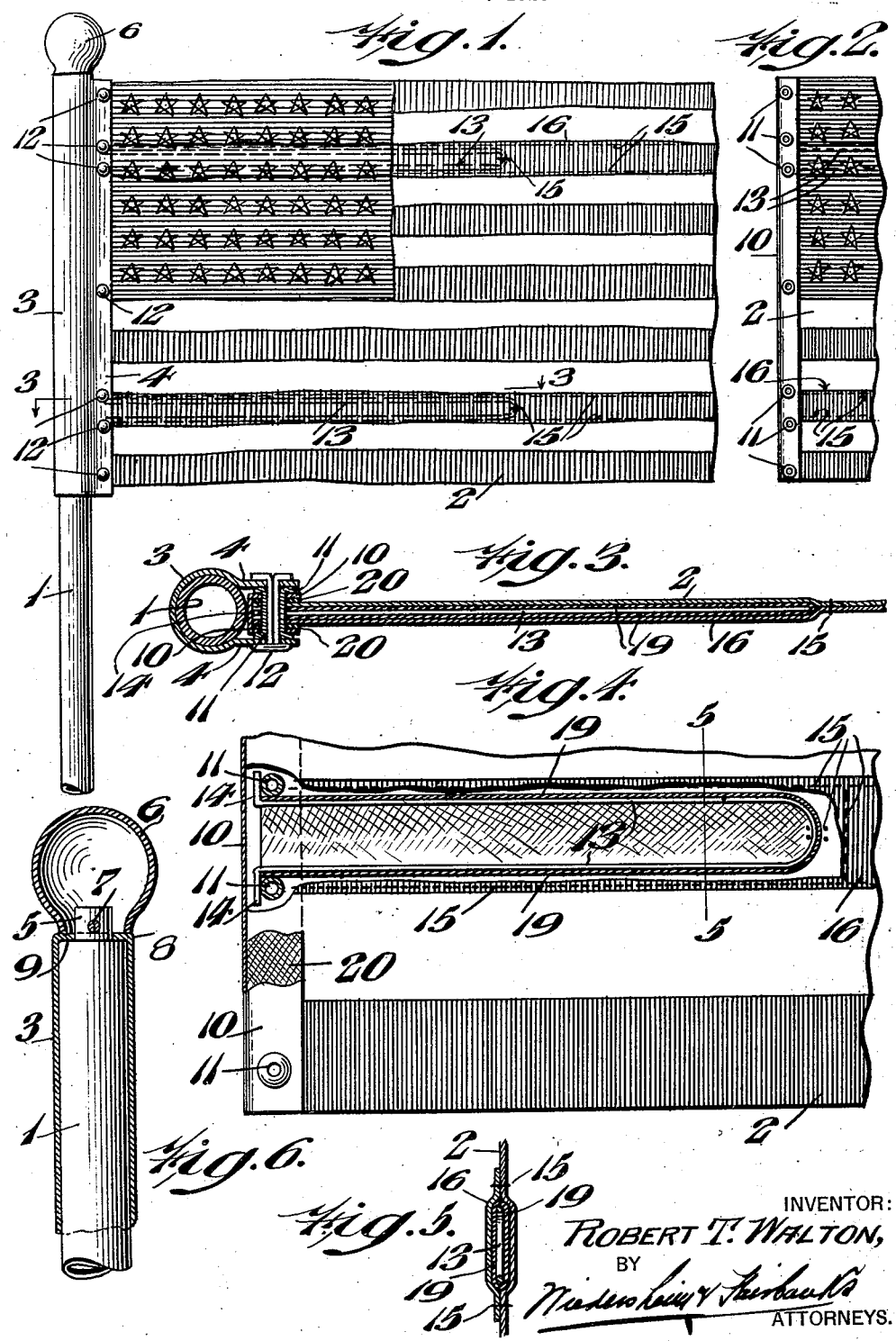

Patented Oct. 25, 1927.

1,646,467

UNITED STATES PATENT OFFICE.

ROBERT T. WALTON, OF PHILADELPHIA, PENNSYLVANIA.

FLAG OR PENNANT SPREADER.

Application filed October 12, 1926. Serial No. 141,042.

This invention relates to flags, pennants, and the like, and has more especial relation to means for supporting the same.

The leading object of the present invention resides in the provision of flag supporting means which is freely rotatable with respect to a flag staff and in which flag spreader means is provided to maintain a flag or the like in a substantially flat plane, irrespective of the direction the wind blows, thus preventing flag furling or wrapping thereof around the flag staff.

A further object is to provide a flag or the equivalent thereof with a generally U-shaped spreader for preventing the furling or wrapping previously referred to.

A still further object resides in the provision of a flag or the like arranged to revolve with respect to a staff and which is detachably clamped with respect to both the flag and staff.

A still further object is to provide a structure of the character stated in which a flag or the like, when detached from a staff, may be folded in compact manner.

Other and further objects reside in the provision of general details of construction and arrangement and combination of parts for attaining the results sought by the foregoing objects.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in side elevation of a flag and its staff, the flag being provided with spreader means embodying the invention.

Fig. 2, is a fragmentary view of a flag detached from its clamp and its staff.

Fig. 3, is a view in horizontal section taken upon the line 3—3 of Fig. 1.

Fig. 4, is a fragmentary view of a detached flag with parts broken away to illustrate details of construction of a spreader.

Fig. 5, is a view in section taken upon the line 5—5 of Fig. 4.

Fig. 6, is a fragmentary view of a staff and the rotatable part shown in Fig. 1 as applied thereto.

Fig. 7, is a view in elevation of a slightly modified form of flag spreader arrangement.

Fig. 8, is an edge view of Fig. 7.

Fig. 9, is a view in side elevation of a flag provided with sectional reinforcement whereby the flag may be compactly folded when detached from its staff or support.

Fig. 10, is a view of the flag shown in Fig. 9, folded into compact form.

For the purpose of illustrating my invention I have shown in the accompanying drawings several forms thereof which are at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the drawings, the reference numeral 1 designates a support or staff for a flag 2, pennant or the like, and the support 1 may be vertically or horizontally disposed as shown in the drawings or may be arranged at an inclination. The staff 1 may be hollow, as shown in Fig. 6, and cylindrical in form. Adapted for detachable connection with respect to the staff 1 is a clamp member 3, preferably of metal, and consisting of a semi-circular portion of integral structure terminating in opposed flanges 4, see Fig. 3, which in effect provides a substantially U-shaped clamping member. The top of the staff 1 is provided with a flat surface terminating in a stud 5 around which the clamping member 3 may freely rotate and a spherical member 6 secured to stud 5 by means of a pin 7 is provided to maintain the shoulder 8 of clamping member 3 in rotatable position upon the upper surface 9 of the clamping member 3. Arranged between the flanges 4 of the clamping member 3 is the end of the flag 2, pennant or the like. This end of the flag is reinforced by means of a metal strip 10 bent U-shaped fashion to fit over the end of the flag and is secured to place by means of eyelets 11. Canvas strips 20 are employed to prevent frictional contact between the flag and the U-shaped strip. Passing through the eyelets 11, as clearly shown in Figs. 1 and 3, are cotter pins 12 whereby the flag 2 and its U-shaped reinforcements 10 are clamped between the flanges 4 of the clamping member 3. This provides a very ready and convenient manner for detaching the flag with respect to both the staff 1 and the clamping member 3, the advantages of which are readily apparent. In order to maintain the flag 2, pennants or the like, in a substantially flat plane, I make use of stretchers, stiffeners, or spreaders designated 13, best seen in Figs. 4, 7, and 9. These spreaders I encase within a canvas covering designated 19. The spreader 13 is preferably made of wire, shaped U fashion, and having its inner ends 14 bent in opposite directions for engaging around adjacent eyelets 11. In practice the flag 2 is made up of a single piece of fabric superimposed upon which are additional strips 16 stitched to the part 2 by means of stitches 15. The strip 16 as stitched to the flag proper forms a pocket, as clearly illustrated in Figs. 4 and 5, to receive the U-shaped spreaders. Thus, a spreader is prevented from escapement and is maintained in proper position at all times. In use the flag with its spreader and rotatably supported upon its staff by means of the clamping member is free to revolve around its staff regardless of the direction in which the wind is blowing, and by reason of the spreaders employed always maintains a substantially single or flat flange, the advantages of which are readily apparent.

Referring now to Figs. 7 and 8, while the flag 2, pennant or the like, is shown as being supported in depending position, instead of having U-shaped metallic pieces 10 secured to the clamping member as in the foregoing figures this metallic strip is secured to the horizontal support 1 by means of rings 17. The rings 17 are caused to engage around the horizontal support 1 and through the eyelets 11 to thus support the flag 2, or the like. Instead of having the U-shaped spreaders 13 secured within pockets in the flag 2, the said spreaders are caused to exteriorly engage the flag 2, as clearly shown in said Figs. 7 and 8. In the connection, it is to be noted that the U-shaped spreaders engage each side of the flag, as clearly shown in Fig. 8, so that the same results are obtained by this structure as are obtained by the structure in the foregoing figures with the exception that the spreader in Figs. 7 and 8 are not concealed, whereas in the foregoing figures they are concealed.

Taking up now Figs. 9 and 10, the spreaders 13 are of the same construction as shown in Figs. 1 and 3, that is, they are concealed within pockets. However, the strip 10, as shown in the foregoing figures, is divided into several sections which are designated 18, whereby the flag when disconnected from its clamping member 3 may be folded into compact form, as clearly illustrated in Fig. 10. Obviously the flag shown in Fig. 9 may be supported as shown in Fig. 1, or as shown in Fig. 7.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:

1. In a device of the character stated, a flag staff, a clamp member of semi-circular shape having opposed flanges, said member being freely rotatable upon said staff, a flag having an edge inserted between said flanges, a U-shaped spreader having its free ends inserted between said flanges, and means passing through said flanges for clamping said flag and spreader to place.

2. In a device of the character stated, a flag staff, a clamp member of semi-circular shape having opposed flanges, said member being freely rotatable upon said staff, a flag having an edge inserted between said flanges, a spreader having its free ends inserted between said flanges, said spreader being relatively U-shaped with its open end arranged opposite said clamp member, and a cotter pin connection passing through said flanges for clamping said flag and spreader to place.

3. In a device of the character stated, a flag staff, a clamp member of semi-circular shape having opposed flanges, said member being freely rotatable upon said staff, a flag having a pocket to receive a spreader, said flag having an edge inserted between said flanges, a spreader having its free ends inserted between said flanges, said spreader being relatively U-shaped with its open end arranged opposite said clamp member and being entirely concealed in said pocket, and means passing through said flanges for clamping said flag and spreader to place.

ROBERT T. WALTON.